United States Patent [19]

Fukuchi et al.

[11] Patent Number: 4,586,395
[45] Date of Patent: May 6, 1986

[54] LUBRICATION DEVICE IN TRANSMISSION UNIT FOR AUTOMOTIVE VEHICLES

[75] Inventors: Hisashi Fukuchi; Masaki Inui; Hideyuki Iwata, all of Toyota, Japan

[73] Assignee: Toyota Jidosha Kabushiki Kaisha, Aichi, Japan

[21] Appl. No.: 606,522

[22] Filed: May 3, 1984

[30] Foreign Application Priority Data

May 10, 1983 [JP] Japan ............................ 58-69519[U]

[51] Int. Cl.4 ...................... F16H 57/04; F16H 1/40; F16H 1/44
[52] U.S. Cl. ...................................... 74/467; 74/710; 74/713; 184/6.12
[58] Field of Search ............... 74/467, 468, 713, 710, 74/700; 184/6.12

[56] References Cited

U.S. PATENT DOCUMENTS

| 2,015,108 | 9/1935 | Harper | 74/467 |
| 3,182,527 | 5/1965 | Bryan | 74/713 |
| 4,018,097 | 4/1977 | Ross | 74/713 |
| 4,157,045 | 6/1979 | Suzuki | 184/6.12 |
| 4,244,242 | 1/1981 | Uno et al. | 74/467 |
| 4,261,219 | 4/1981 | Suzuki et al. | 74/710 |
| 4,283,963 | 8/1981 | Hickey et al. | 74/713 |
| 4,319,499 | 3/1982 | Sanui et al. | 184/6.12 |
| 4,352,301 | 10/1982 | Fleury | 74/713 |
| 4,366,724 | 1/1983 | Yamamori et al. | 74/467 |
| 4,402,238 | 9/1983 | Craig | 74/710 |
| 4,495,830 | 1/1985 | Yasue et al. | 74/467 |

FOREIGN PATENT DOCUMENTS

| 22445 | 3/1978 | Japan . | |
| 48009 | 9/1980 | Japan | 74/467 |

Primary Examiner—Lawrence J. Staab
Assistant Examiner—Michael D. Bednarek
Attorney, Agent, or Firm—Parkhurst & Oliff

[57] ABSTRACT

A transmission unit comprises a differential gear unit having a pair of side-journals rotatably supported by a pair of axially spaced side-bearings carried on a pair of carrier portions of a casing for the transmission unit, a pair of wheel axles extending outwardly through the respective side-journals from the differential gear unit in an opposite direction and surrounded by a pair of annular seal members carried on the respective carrier portions, a pair of annular shim plates interposed between each of the carrier portions and each of the side-bearings, and a pair of oil passages for leading lubricating oil into a pair of annular side-spaces formed around each of the wheel axles between the respective side-bearings and the respective seal members. Each of the annular shim plates is formed at the inner peripheral portion thereof with a number of circumferentially spaced radial projections and recesses which are arranged to radially lead the lubricating oil onto each of the wheel axles for lubrication of the side-journals.

4 Claims, 3 Drawing Figures

LUBRICATION DEVICE IN TRANSMISSION UNIT FOR AUTOMOTIVE VEHICLES

BACKGROUND OF THE INVENTION

The present invention relates to a transmission unit for automotive vehicles, and more particularly to an improvement of a lubrication device for a differential gear unit of the transmission unit.

In U.S. Pat. No. 4,261,219 issued on Apr. 14, 1981, there has been proposed a transmission unit which comprises a casing arranged to store an amount of lubricating oil in a bottom portion thereof and having a pair of carrier portions at the opposite sides thereof, a differential gear unit arranged within the casing and having a pair of side-journals rotatably supported by a pair of axially spaced side-bearings carried on the respective carrier portions, a ring gear integral with the differential gear unit and in mesh with a drive pinion on an output shaft of the transmission unit to drive the differential gear unit, a pair of wheel axles extending outwardly through the respective side-journals from side gears of the differential gear unit in an opposite direction and surrounded by a pair of annular seal members carried on the respective carrier portions, a pair of annular shim plates interposed between each of the carrier portions and each of the side-bearings to position the respective side-journals in place, and passages means for leading lubricating oil picked up by the ring gear into a pair of annular side-spaces formed around each of the wheel axles between the respective side-bearings and the respective seal members. In such a construction of the differential gear unit, it is intended to effectively distribute lubricating oil picked up by the ring gear to lubricate the respective side-bearings and the respective side-journals and to lubricate the respective sealed portions of the wheel axles. It has been, however, experienced that sufficient lubrication of the side-journals may not be effected because the lubricating oil from the passage means flows along each peripheral portion of the shim plates and is stored in each oil well formed within each lower portion of the annular side-spaces. For this reason, there will occur unexpected defacement of the side-journals of the differential gear unit, particualry when the vehicle is turning at a high speed.

SUMMARY OF THE INVENTION

It is, therefore, a primary object of the present invention to provide an improved lubrication device for the transmission unit which is capable of leading lubricating oil onto the wheel axles for sufficient lubrication of the side-journals.

According to the present invention, the above object is accomplished by provision of a transmission unit of the type described above in which each of the annular shim plates is formed at the inner peripheral portion thereof with a number of circumferentially spaced radial projections and recesses for effecting the flow of lubricating oil onto the wheel axles. Preferably, each inner diameter of the annular shim plates at their recesses is determined to be smaller than that of each outer race of the side-bearings to provide an oil well within each lower portion of the annular side-spaces.

BRIEF DESCRIPTION OF THE DRAWINGS

Additional objects and advantages of the present invention will be more readily apparent from the following detailed description of a preferred embodiment thereof when taken together with the accompanying drawings, in which.

DETAILED DESCRIPTION OF THE PREFERRED EMBODIMENT

Figure 1:
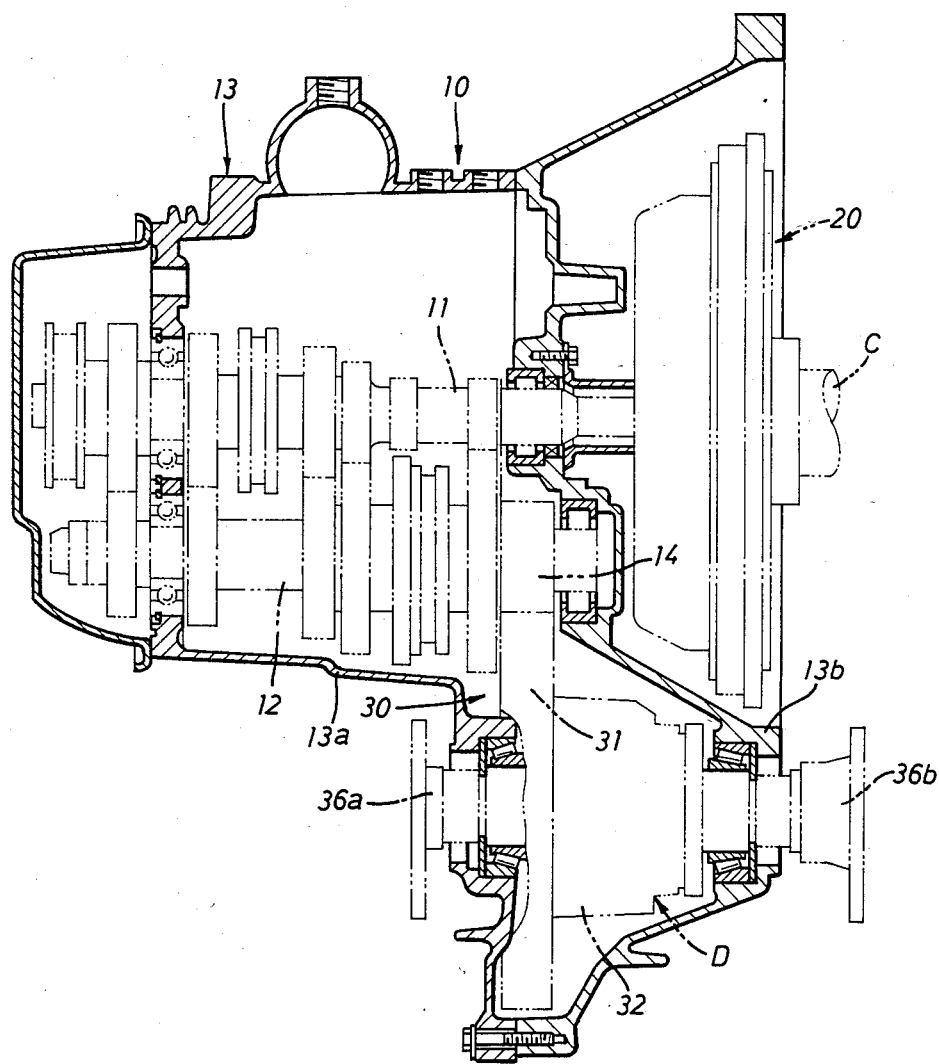
FIG. 1 is a schematative sectional view of a transmission unit in accordance with the present invention.

Referring now to the drawings, in particular to FIG. 1, there is illustrated a transmission unit 10 which is transversely mounted together with a clutch device 20 on an automotive vehicle of the front-engine, front-wheel drive type and located at one side of an internal combustion engine of the transversely mounting type (not shown). The transmission unit 10 comprises an input shaft 11 coaxial with a crankshaft C of the engine, and an output shaft 12 arranged in parallel with the input shaft 11. A casing assembly 13 for the transmission unit 10 contains therein a final drive gearing 30 and stores an amount of lubricating oil, which casing assembly 13 includes a transmission casing 13a and a trans-axle casing 13b jointed to each other in a fluid-tight manner.

The final drive gearing 30 comprises a differential gear unit D rotatably supported from the trans-axle casing 13b, and a ring gear 31 integral with the differential gear unit D and permanently in mesh with an output gear 14 fixed to the output shaft 12. As can be well seen in FIG. 2, the differential gear unit D comprises a differential cage 32 to which the ring gear 31 is integrally bolted, a pair of pinion gears 34a, 34b arranged within the differential cage 32 and rotatably supported by a pinion shaft 33 fixed to cage 32, and a pair of side-gears 35a, 35b rotatably mounted on cage 32 and permanently in mesh with the respective pinion gears 34a, 34b. The differential cage 32 has a pair of sleevelike side-journals 32a and 32b. A pair of front wheel axles 36a, 36b are connected at their inner ends to the side-gears 35a, 35b respectively by means of a spline connection and extend outwardly through the respective side-journals 32a, 32b in an opposite direction.

In the differential gear unit D, the side-journals 32a and 32b of cage 32 are rotatably supported by a pair of tapered roller bearings 41, 42 which are carried on a pair of carrier portions of casing assembly 13. The roller bearings 41, 42 are positioned in place by means of a pair of annular shim plates 43, 44. The front wheel axles 36a, 36b are rotatably supported by the respective side-journals 32a, 32b of differential cage 32 and surrounded by a pair of annular seal members 45a, 45b mounted on the carrier portions of casing assembly 13 at the outside of the respective roller bearings 42, 43. Thus, the front wheel axles 36a, 36b are supported in a fluid-tight manner on the carrier portions of casing assembly 13, and a pair of annular side-spaces are formed around each of the front wheel axles 36a, 36b between the respective side-bearings 41, 42 and the respective seal members 45a, 45b.

To sufficiently supply lubricating oil into the annular side-spaces, a pair of oil passages 13c, 13d are formed in opposite upright side walls of the casing assembly 13 to receive lubricating oil picked up by the ring gear 31 and lead it into the respective side-spaces. The oil passages 13c and 13d are located above the respective side-spaces and open at their lower ends into each upper portion of the side-spaces. As can be well seen in FIG. 3, each of the annular shim plates 43, 44 is formed at its inner peripheral portion with a plurality of circumferentially equi-spaced radial recesses 43a (44a) and projections 43b (44b). Each inner diameter of the annular shim plates 43, 44 at their recesses 43a, 44a is smaller than each inner diameter of outer races 41a, 41a of the side-bearings 41, 42 to provide an oil well within each lower portion of the annular side-spaces. Each inner diameter of the annular shim plates 43, 44 at their radial projections 43b, 44b is larger than each outer diameter of inner races 41b, 42b of the side-bearings 41, 42.

In operation, rotational torque from crankshaft C of the engine is applied to the input shaft 11 of transmission unit 10 by way of the clutch device 20 and transmitted to the output shaft 12 under control of a change-speed gearing mounted on shafts 11 and 12. Thus, the differential gear unit D is applied with the rotational torque through the ring gear 31 in mesh with the output gear 14 on shaft 12, and in turn, the rotational torque is transmitted to the side-gears 35a, 35b by way of the pinion gears 34a, 34b to drive the front wheel axles.

Figure 3:
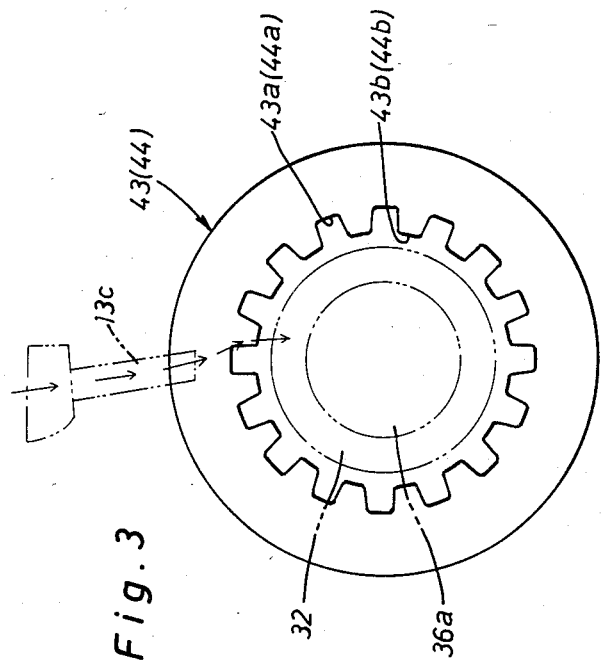
FIG. 3 is a front view of an annular shim plate assembled within the differential gear unit.
Figure 2:
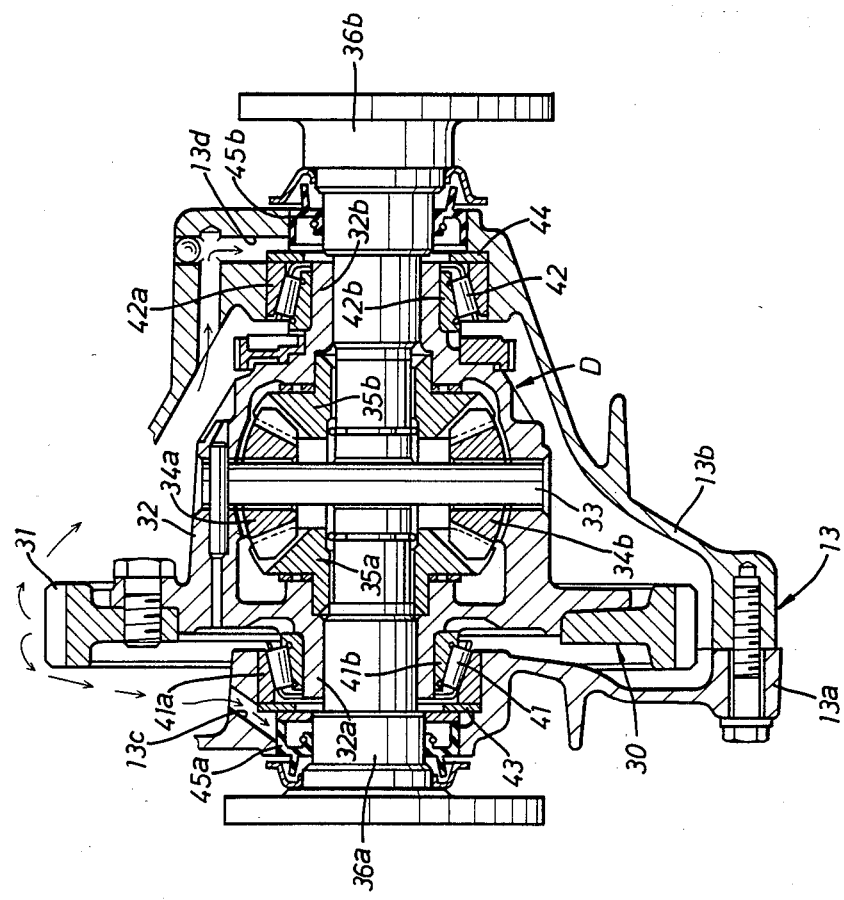
FIG. 2 is an enlarged vertical sectional view of a differential gear unit shown in FIG. 1.

During the operation of differential gear unit 30, the lubricating oil in casing assembly 13 is picked up by ring gear 31 and flows into the respective oil passages 13c and 13d as shown by arrows in FIG. 2. The lubricating oil from passage 13c is supplied into the side-space between annular shim plate 43 and seal member 45a, while the lubricating oil from passage 13d is supplied into the side-space between annular shim plate 44 and seal member 45b. Although the lubricating oil tends to flow along each outside peripheral portion of annular shim plates 43, 44, a portion of the lubricating oil from passage 13c flows along the upper portion of projections 43b of shim plate 43 and drops onto the front wheel axle 36a, as shown in FIG. 3, while a portion of the lubricating oil from passage 13d flows along the upper portion of projections 44b of shim plate 44 and drops onto the front wheel axle 36b. Thus, the flow of lubricating oil along the left front wheel axle 36a effects sufficient lubrication of the left side-journal 32a of differential case 32, while the flow of lubricating oil along the right front wheel axle 36b effects sufficient lubrication of the right side-journal 32b of differential cage 32. The remaining lubricating oil is stored in each oil well formed by the lower portions of the annular shim plates 43, 44 to effect sufficient lubrication of the respective side-bearings 41, 42 and the respective seal members 45a, 45b. Even if the annular shim plates 43, 44 rotate due to unexpected load acting thereto, the lubricating oil will be radially guided by the radial projections 43b, 44b of the respective shim plates to flow onto the respective wheel axles.

Although a certain specific embodiment of the present invention has been shown and described, it is obvious that many modifications and adaptations thereof are possible in light of these teachings. For instance, in the actual practices of the present invention, the arrangement of the annular shim plates 43, 44 may be adapted to a final drive gearing for various transmission units, and the circumferentially equi-spaced radial projections and recesses of the respective annular shim plates may be modified in an appropriate configuration. It is to be understood therefore that within the scope of the appended claims, the invention may be practiced otherwise than as specifically described herein.

What is claimed is:

1. In a transmission unit for automotive vehicles, comprising:

a casing arranged to store an amount of lubricating oil in a bottom portion thereof and having a pair of carrier portions at the opposite sides thereof;

a differential gear unit arranged within said casing and having a pair of side-journals rotatably supported by a pair of axially spaced side-bearings carried on the respective carrier portions of said casing;

a ring gear integral with said differential gear unit and in mesh with an output gear on an output shaft of said transmission unit to drive said differential gear unit;

a pair of wheel axles extending outwardly through said respective side-journals from said differential gear unit and surrounded by a pair of annular seal members carried on the respective carrier portions;

a pair of annular shim plates interposed between each of the carrier portions and each of said side-bearings to position said respective side-journals in place; and passage means for leading lubricating oil picked up by said ring gear into a pair of annular side-spaces formed around each of said wheel axles between the respective side-bearings and the respective seal members;

wherein each of said annular shim plates is formed the inner peripheral portion thereof with a plurality of circumferentially spaced radial projections and recesses which are arranged in such a manner that a portion of the lubricating oil flowing along each outside peripheral portion of said annular shim plate is guided radially inwardly by the radial projections of said respective shim plates to flow onto each of said wheel axles for lubrication of said side-journals.

2. A transmission unit according to claim 1, wherein each inner diameter of said annular shim plates at their recesses is smaller than that of each outer race of said side-bearings to provide an oil well within each lower portion of said annular side-spaces.

3. A transmission unit according to claim 1, wherein the radial projections and recesses of said respective annular shim plates are circumferentially equi-spaced.

4. A transmission unit according to claim 1, wherein said passage means is a pair of oil passages formed in opposite upright side walls of said casing to receive lubricating oil picked up by said ring gear, each of said oil passages leading the lubricating oil into an upper portion of each of said annular side-spaces.

* * * * *